US012779826B2

(12) United States Patent
Bender et al.

(10) Patent No.: US 12,779,826 B2
(45) Date of Patent: Nov. 3, 2026

(54) HYDRAULIC HOSE

(71) Applicant: Eaton Intelligent Power Limited, Dublin (IE)

(72) Inventors: Pierre Bender, Gernsbach (DE); Rakos Attila, Miskolc (HU); Dipak Singh, Pune (IN); Volkan Karayazi, Cerkezkoy (TR)

(73) Assignee: DANFOSS A/S, Nordborg (DK)

( * ) Notice: Subject to any disclaimer, the term of this patent is extended or adjusted under 35 U.S.C. 154(b) by 139 days.

(21) Appl. No.: 16/955,795

(22) PCT Filed: Dec. 10, 2018

(86) PCT No.: PCT/EP2018/084168

§ 371 (c)(1),
(2) Date: Jun. 19, 2020

(87) PCT Pub. No.: WO2019/121104

PCT Pub. Date: Jun. 27, 2019

(65) Prior Publication Data

US 2020/0338869 A1 Oct. 29, 2020

(30) Foreign Application Priority Data

Dec. 20, 2017 (IN) ............................ 201711045916
Mar. 15, 2018 (GB) .................................... 1804151

(51) Int. Cl.

| | |
|---|---|
| ***B32B 25/16*** | (2006.01) |
| ***B32B 1/08*** | (2006.01) |
| ***B32B 7/02*** | (2019.01) |
| ***B32B 15/06*** | (2006.01) |
| ***C08L 9/02*** | (2006.01) |
| ***C08L 13/00*** | (2006.01) |
| ***C08L 15/00*** | (2006.01) |
| ***C08L 79/02*** | (2006.01) |

(52) U.S. Cl.

CPC ................ *B32B 25/16* (2013.01); *B32B 1/08* (2013.01); *B32B 7/02* (2013.01); *B32B 15/06* (2013.01); *C08L 9/02* (2013.01); *C08L 13/00* (2013.01); *C08L 15/00* (2013.01); *C08L 79/02* (2013.01); *B32B 2305/184* (2013.01); *B32B 2597/00* (2013.01)

(58) Field of Classification Search

CPC ......... B32B 1/02; B32B 1/08; Y10T 428/139; Y10T 428/1352
USPC ................................................ 428/35.7, 36.9
See application file for complete search history.

(56) References Cited

U.S. PATENT DOCUMENTS

| | | | | |
|---|---|---|---|---|
| 3,884,285 | A * | 5/1975 | Russell | C08K 5/36 523/213 |
| 6,569,943 | B2 * | 5/2003 | Lane | C08F 290/06 428/36.1 |
| 7,566,486 | B2 * | 7/2009 | Bourgois | F16L 11/085 428/35.8 |
| 2010/0209723 | A1 * | 8/2010 | Tanaka | C09J 129/04 525/61 |
| 2012/0015202 | A1 * | 1/2012 | Kenens | C08L 23/16 428/500 |
| 2014/0148555 | A1 * | 5/2014 | Mruk | B29C 73/163 525/332.9 |
| 2017/0029603 | A1 | 2/2017 | Fujiwara | |

FOREIGN PATENT DOCUMENTS

| | | | |
|---|---|---|---|
| CN | 106661277 | A * | 5/2017 |
| EP | 1188522 | A2 | 3/2002 |
| EP | 2891694 | A1 | 7/2015 |
| GB | 1369894 | A * | 10/1974 |
| JP | 2009155441 | A | 7/2009 |
| WO | WO-2017/199805 | A1 * | 11/2017 |

OTHER PUBLICATIONS

Wikipedia, Nitrile Rubber, 2000-2022.*
Sui et al, ACS Applied, pp. 9173-9179, Aug. 26, 2013.*
Difference Between, 2016, https://www.differencebetween.com/author/yash/.*
Machine Translation of JP 2009155441 (Year: 2009).*

* cited by examiner

*Primary Examiner* — Callie E Shosho
(74) *Attorney, Agent, or Firm* — LEYDIG, VOIT & MAYER , LTD

(57) ABSTRACT

A hydraulic hose includes: an innermost layer tube encircling at least one channel. The innermost layer tube has a self-sealing material composition including an elastomeric material and a polyalkyleneimine. In an embodiment, the polyalkyleneimine is selected from polyethyleneimine, polypropyleneimine, polybutyleneimine, and polypentyleneimine. In an embodiment, the polyalkyleneimine is linear or branched.

15 Claims, 1 Drawing Sheet

HYDRAULIC HOSE

CROSS-REFERENCE TO PRIOR APPLICATIONS

This application is a U.S. National Phase application under 35 U.S.C. § 371 of International Application No. PCT/EP2018/084168, filed on Dec. 10, 2018, and claims benefit to British Patent Application No. GB 1804151.7, filed on Mar. 15, 2018 and to Indian Patent Publication No. IN 2017/11045916, filed on Dec. 20, 2017. The International Application was published in English on Jun. 27, 2019 as WO 2019/121104 under PCT Article 21(2).

FIELD

The invention relates to a hydraulic hose.

BACKGROUND

Conventional hydraulic hoses, which are used for transporting hydraulic liquids or gas (e.g. steam), have a limited lifetime because of hose failures due to e.g. pressure, pressure changes, temperature, aging, movement, abrasion, fluid aggressiveness etc. The hose failures mostly start with micro-sized cracks and surface defects of the elastomeric material used for the innermost layer tube, which is in contact with the hydraulic liquid or gas.

SUMMARY

In an embodiment, the present invention provides a hydraulic hose, comprising: an innermost layer tube encircling at least one channel, wherein the innermost layer tube comprises a self-sealing material composition comprising an elastomeric material and a polyalkyleneimine.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
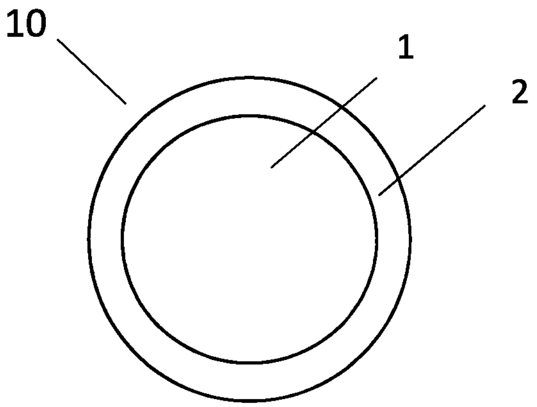
FIGS. 1 and 2 show schematic cross-sectional views of different embodiments of hydraulic hoses.

In an embodiment, the present invention provides a hydraulic hose which is more resistant to initial failure and to provide a method for producing a hydraulic hose. In an embodiment, the present invention provides a use of a self-sealing material composition for a hydraulic hose.

Such a hydraulic hose, a method for producing a hydraulic hose, and a use of a self-sealing material composition for an innermost layer tube of a hydraulic hose are described herein.

A hydraulic hose is specified. Here and in the following, a hydraulic hose means that the hose is capable of transporting hydraulic liquids, especially through at least one channel, for example oils or fuels, especially under high pressure.

According to one embodiment, the hydraulic hose comprises an innermost layer tube encircling at least one channel. The innermost layer tube comprises a self-sealing material composition comprising an elastomeric material and a polyalkyleneimine.

The material composition for the innermost layer tube has a self-sealing ability. Due to the self-sealing ability of the material composition, initial cracks inside the hose, especially of the innermost layer tube, can be healed. This prevents early life failures of the hydraulic hose and therefore increases the lifetime and the quality of the hose. Advantageously the hydraulic hose does not have to be replaced, or at least does not have to be immediately replaced, due to initial cracks. At least the mean time between maintenance and replacement of the hose is reduced. Advantageously the cracks of the innermost layer tube are healed automatically, in other words the self-sealing takes place without any external force or intervention. This is due to the nucleophilic and quite reactive amine groups present in the polyalkyleneimine, which forms chemical bonds with the elastomeric material in the case of a crack as a results of tube degradation. In addition the production of the hydraulic hose is easier as small defects don't have any effect as they are healed due to the self-sealing ability of the material composition. In high temperature applications the process of healing initial cracks of the innermost layer tube is advantageously fastened.

According to one embodiment the self-sealing material composition comprises 0.5 to 50% per weight of the polyalkyleneimine in relation to the overall weight of the elastomeric material and the polyalkyleneimine.

According to one embodiment, the polyalkyleneimine is selected from polyethyleneimine, polypropyleneimine, polybutyleneimine, polypentyleneimine and combinations thereof.

According to one embodiment, the polyalkyleneimine is linear or branched. Preferably, the polyalkyleneimine is branched. By using a branched polyalkyleneimine more reactive amine sites are present, so that the probability of initial cracks being healed is increased. In addition by the use of branched polyalkyleneimine the tensile strength is maintained at the repaired area of the innermost layer tube.

According to one embodiment, the polyalkyleneimine is a linear or branched polyethyleneimine.

According to one embodiment, the polyalkyleneimine is a branched polyethyleneimine of the following formula:

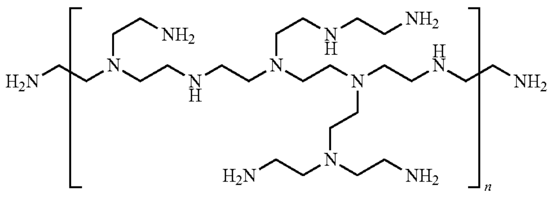

with n≠0.

According to one embodiment the polyethyleneimine can be functionalized with an urea group.

According to one embodiment, the branched polyethyleneimine has a molar mass distribution MW between 500 g/mol and 50000 g/mol, preferably between 500 g/mol and 25000 g/mol, more preferably between 800 g/mol and 5000 g/mol. For example, the branched polyethyleneimine has a molar mass distribution MW of 800 g/mol or 2000 g/mol. The higher the molar mass distribution, the better the self-sealing ability.

According to one embodiment the elastomeric material comprises C═O groups

Then for example the following reaction takes place between the elastomeric material and the polyalkyleneimine, in which an amide group is formed:

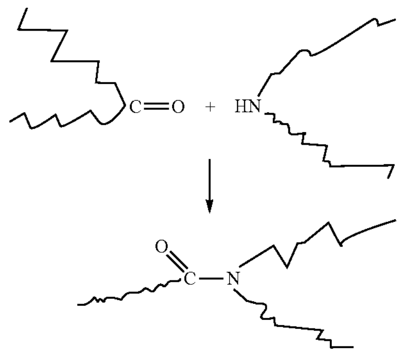

According to one embodiment, the elastomeric material is a butadiene polymer or a butadiene copolymer. By using those elastomeric materials for the innermost layer tube, the flexibility of the hose can be guaranteed.

According to one embodiment, the elastomeric material is a nitrile butadiene rubber. Nitrile butadiene rubbers are unsaturated copolymers of 2-propenenitrile and butadiene monomers, especially 1,2-butadiene and/or 1,3-butadiene. This type of elastomeric material is very resistant to fuel, oil and other chemicals and can withstand very high internal working pressures which can occur in hydraulic hoses. In the case of an initial crack chemical bonds, especially covalent bonds, are formed between the polyalkyleneimine and the nitrile butadiene rubber such that the initial cracks are healed.

Advantageously this bond formation takes place without any external intervention and this process is even fastened at high temperature applications of the hydraulic hose.

According to one embodiment, the elastomeric material is a acrylonitrile butadiene rubber of the following formula:

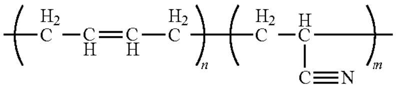

with m≠0 and n≠0.

According to one embodiment the elastomeric material is a modified acrylonitrile butadiene rubber of one of the following formula:

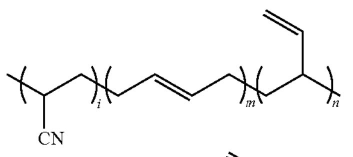

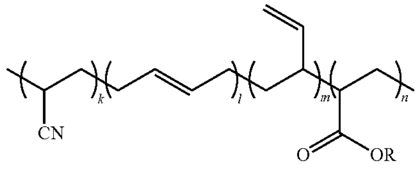

with m≠0, n≠0, i≠0, k≠0.

R may be, for example, a metal ion like Zn, H or an alkyl group, like a methyl or ethyl group for example.

According to one embodiment, the elastomeric material is a is a unsaturated elastomeric material. For example the elastomeric material according to this embodiment can be a polychloroprene or a modified polychloroprene.

According to one embodiment the elastomeric material, especially the nitrile butadiene rubber, the modified nitrile butadiene rubber, the polychloroprene or the modified polychloroprene is vulcanised.

According to one embodiment the innermost layer tube has a layer thickness of between 0.5 mm and 4.0 mm.

According to one embodiment, the hydraulic hose further comprises at least one intermediate layer and/or an outer layer covering the innermost layer tube.

According to one embodiment, the at least one intermediate layer is a metal or textile braiding covering or spiraling covering the innermost layer tube. Preferably the metal or textile braiding or spiraling covers the innermost layer tube completely.

According to one embodiment, the outer layer comprises a self-sealing material composition comprising an elastomeric material and a polyalkyleneimine and covers the at least one intermediate layer. Preferably the outer layer covers the intermediate layer completely. According to this embodiment also in the outer layer, which is preferably the outermost layer of the hydraulic hose, initial cracks which may occur from light abrasion or any other environmental effects can be healed due to the self-sealing ability of the self-sealing material composition used.

All features concerning the self-sealing material mentioned for the innermost layer tube can also be features of the self-sealing material of the outer layer.

According to one embodiment the innermost layer tube and the outer layer, preferably the outermost layer, comprise the same self-sealing material composition.

The specified embodiments of the hydraulic hose can be produced in accordance with the method mentioned below. All features of the hydraulic hose that are mentioned under the method can also be features of the above-explained exemplary embodiments of the hydraulic hose and vice versa.

A method for producing a hydraulic hose is specified.

According to one embodiment, the hydraulic hose comprises an innermost layer tube encircling at least one channel wherein the innermost layer tube comprises a self-sealing material composition comprising an elastomeric material and a polyalkyleneimine.

The method comprises the following steps, preferably in the given sequence:

A) mixing an elastomeric material and a polyalkyleneimine,

B) extruding the mixture of step A),

C) curing the extruded mixture of step B) to form an innermost layer tube encircling at least one channel and which comprises an elastomeric material and a polyalkyleneimine.

Advantageously the polyalkyleneimine is stable to temperatures up to 250° C. such that it can be mixed to the elastomeric material and does not degrade in the extruding step and/or in an optional vulcanization step.

Polyalkyleneimines, especially polyalkyleneimines with different molar mass distributions, are commercially available.

The method of producing the elastomeric material is known to a person skilled in the art. For example nitrile butadiene rubber can be produced by a co-polymerisation of 2-propenenitrile and butadiene monomers e.g. 1,2-butadiene and 1,3-butadiene.

Further, the use of a self-sealing material composition comprising an elastomeric material and a polyalkyleneimine for an innermost layer tube of a hydraulic hose is specified.

All features of the hydraulic hose that are mentioned above and all features mentioned above for the method of producing a hydraulic hose can also be features of the use of the self-sealing material composition and vice versa.

In the following, the present invention will be demonstrated based on a working example and a comparative example.

For the working example a tube made of a mixture of a standard elastomeric material is mixed with a polyalkyleneimine, and as a comparative example a standard tube consisting of the same standard elastomeric material is used.

Comparative physical loss tests after crack generation was done with the working and the comparative example. The results are shown in the table below:

| | comparative example | working example |
|---|---|---|
| Original Tensile Strength [MPa] | 178 | 159 |
| Original Elongation Break [%] | 132 | 164 |
| Tensile Strength after cut and 24 h healing period [MPa] | 153 | 164 |
| Elongation Break after cut and 24 h healing period [%] | 111 | 166 |
| Drop in Tensile Strength [%] | −14 | 3 |
| Drop in Elongation Break [%] | −16 | 1 |

What can be seen from these tests, is that the working example shows a reversion of the tensile strength and the elongation break 24 hours after the crack generation (cut), whereas the comparative example shows an immense drop in tensile strength and elongation break. This shows the excellent self-sealing ability of the material composition for an innermost layer tube of a hydraulic hose. By using the inventive self-sealing material composition for an innermost layer tube of a hydraulic hose, early life failures of the hydraulic hose due to cracks or pin-holes in the production process can be reduced.

In the figures, identical or identically acting constituent parts are provided in each case with the same reference signs. The illustrated elements and their size relationships to each other should not be regarded as true to scale. Rather, individual elements, in particular layer thicknesses, may be illustrated with an exaggerated size in order to afford a better understanding.

The hydraulic hose 10 in accordance with FIG. 1 exhibits a channel 1 in which hydraulic fluids can be transported. An innermost layer tube 2 encircles the channel 1. The innermost layer tube 2 comprises a self-sealing material composition comprising a nitrile butadiene rubber and a branched polyethyleneimine with a molar mass distribution of, for example, 800 g/mol or 2000 g/mol. Due to the self-sealing ability of the material composition, initial cracks due to for example pressure, pressure drops, temperature, aging, movement, abrasion and fluid aggressiveness of the innermost layer tube can be healed. This prevents early life failures of the hydraulic hose and therefore increases the lifetime and the quality of the hose.

Figure 2:
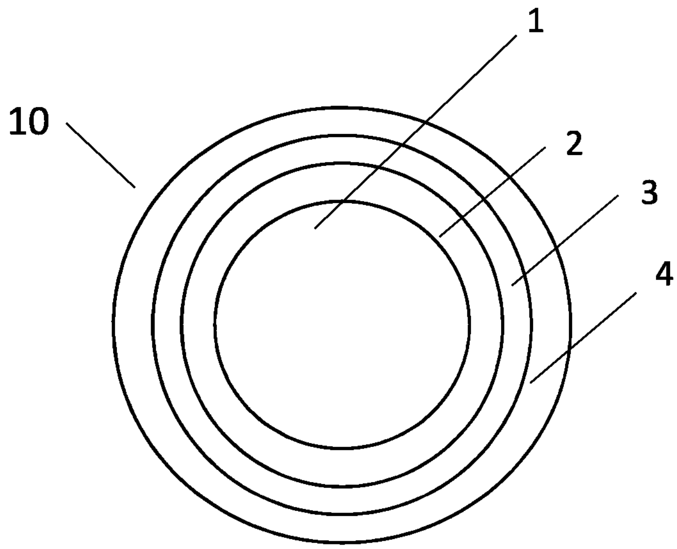

In comparison to the hydraulic hose of FIG. 1, the hydraulic hose 10 of FIG. 2 further comprises an intermediate layer 3, for example a metal braiding and an outer layer 4 comprising a self-sealing material composition which can comprise the same elastomeric material and the same polyalkyleneimine as the innermost layer tube 2. Here in the outer layer 4, which is preferably the outermost layer of the hydraulic hose 10, initial cracks which may occur from light abrasion or any other environmental effects can also be healed due to the self-sealing ability of the material composition.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

We claim:

1. A hydraulic hose, comprising:

an innermost layer tube encircling at least one channel, wherein the innermost layer tube comprises a self-sealing material composition comprising an elastomeric material and a polyalkyleneimine; and wherein the elastomeric material is covalently bonded directly to the polyalkyleneimine, wherein the polyalkyleneimine is a branched polyethyleneimine of the following formula:

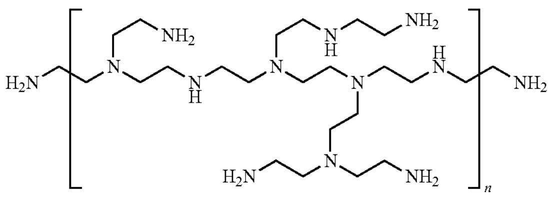

wherein n≠0.

2. The hydraulic hose according to claim 1, wherein the branched polyethyleneimine has a molar mass distribution Mw between 500 g/mol and 50000 g/mol.

3. The hydraulic hose according to claim 1, wherein the elastomeric material comprises a butadiene copolymer or a polychloroprene.

4. The hydraulic hose according to claim 1, wherein the elastomeric material comprises a acrylonitrile butadiene rubber.

5. The hydraulic hose according to claim 1, wherein the elastomeric material comprises a acrylonitrile butadiene rubber of the following formula:

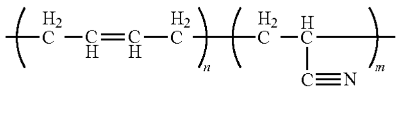

wherein m≠0 and n≠0.

6. The hydraulic hose according to claim 1, wherein the elastomeric material comprises a modified acrylonitrile butadiene rubber of the following formula:

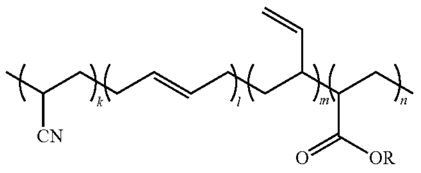

with R being a metal ion, H, or an alkyl group; and m≠0, n≠0, i≠0, and k≠0.

7. The hydraulic hose according to claim 1, further comprising at least one intermediate layer and/or an outer layer covering the innermost layer tube.

8. The hydraulic hose according to claim 7, wherein the at least one intermediate layer comprises a metal braiding covering the innermost layer tube and the outer layer comprises a self-sealing material composition comprising an elastomeric material and a polyalkyleneimine and covers the at least one intermediate layer.

9. The hydraulic hose according to claim 1, wherein the hydraulic hose is produced by a process comprising:

A) mixing the elastomeric material and the polyalkyleneimine to provide a mixture;

B) extruding the mixture of step A) to provide an extruded mixture; and

C) curing the extruded mixture of step B) to form the innermost layer tube encircling at least one channel and which comprises the elastomeric material and the polyalkyleneimine.

10. The hydraulic hose according to claim 1, wherein the elastomeric material comprises C═O groups and the polyalkyleneimine is attached to the elastomeric material by an amide bond.

11. The hydraulic hose according to claim 1, wherein the elastomeric material comprises nitrile butadiene rubber.

12. The hydraulic hose according to claim 1, wherein the polyalkyleneimine is present in an amount of 0.5 to 50% by weight, based on total weight of the elastomeric material and the polyalkyleneimine.

13. The hydraulic hose according to claim 1, wherein the elastomeric material comprises a modified acrylonitrile butadiene rubber of the following formula:

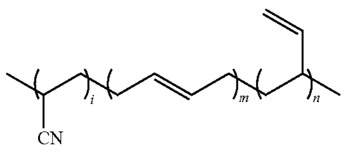

wherein m≠0, n≠0, and i≠0.

14. A method for producing the hydraulic hose according to claim 1, comprising:

A) mixing the elastomeric material and the polyalkyleneimine to provide a mixture;

B) extruding the mixture of step A) to provide an extruded mixture; and

C) curing the extruded mixture of step B) to form the innermost layer tube encircling at least one channel and which comprises the elastomeric material and the polyalkyleneimine.

15. A method of providing a hydraulic hose, comprising:

providing an innermost layer tube encircling at least one channel, wherein the innermost layer tube comprises a self-sealing material composition comprising an elastomeric material and a polyalkyleneimine; and wherein the elastomeric material is covalently bonded directly to the polyalkyleneimine, wherein the polyalkyleneimine is a branched polyethyleneimine of the following formula:

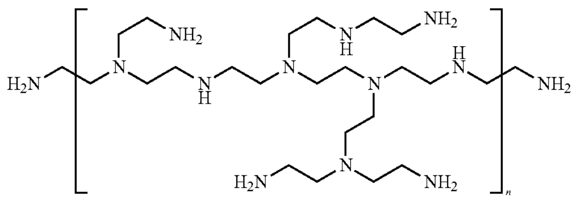

wherein n≠0.

* * * * *